US011823086B2

(12) United States Patent
Zhou et al.

(10) Patent No.: US 11,823,086 B2
(45) Date of Patent: Nov. 21, 2023

(54) MEMBERSHIP ANALYZING METHOD, APPARATUS, COMPUTER DEVICE AND STORAGE MEDIUM

(71) Applicant: Beijing Hydrophis Network Technology Co., Ltd., Beijing (CN)

(72) Inventors: Weijie Zhou, Beijing (CN); Feng Hong, Beijing (CN); Min Huang, Beijing (CN); Wenbi Cai, Beijing (CN); Shanliang Xiong, Beijing (CN); Youpeng Wei, Beijing (CN)

(73) Assignee: Beijing Hydrophis Network Technology Co., Ltd., Beijing (CN)

( * ) Notice: Subject to any disclaimer, the term of this patent is extended or adjusted under 35 U.S.C. 154(b) by 143 days.

(21) Appl. No.: 17/397,979

(22) Filed: Aug. 9, 2021

(65) Prior Publication Data
US 2022/0245591 A1    Aug. 4, 2022

(30) Foreign Application Priority Data

Jan. 29, 2021   (CN) .......................... 202110132763.1

(51) Int. Cl.
*G06Q 10/105* (2023.01)
(52) U.S. Cl.
CPC ................ *G06Q 10/105* (2013.01)
(58) Field of Classification Search
CPC ........ G06Q 10/105; G06F 16/34; G06F 16/35
See application file for complete search history.

(56) References Cited

U.S. PATENT DOCUMENTS

| 11,416,531 | B2 * | 8/2022 | Truong | ................ G06F 40/205 |
|---|---|---|---|---|
| 2006/0242122 | A1 * | 10/2006 | DeVorchik | ............ G06F 16/148 |
| 2015/0379113 | A1 * | 12/2015 | Wang | .................... H04L 67/306 |
| | | | | 707/738 |
| 2016/0094561 | A1 * | 3/2016 | Jagtap | ................. G06F 21/6218 |
| | | | | 726/28 |
| 2016/0260063 | A1 * | 9/2016 | Harris | .................. G06Q 10/105 |
| 2016/0350696 | A1 * | 12/2016 | Delaney | .......... G06Q 10/063114 |
| 2018/0314915 | A1 * | 11/2018 | Cai | ........................ G06N 5/022 |
| 2021/0383261 | A1 * | 12/2021 | Hanna | .................. G06Q 10/105 |

* cited by examiner

*Primary Examiner* — Dennis W Ruhl
*Assistant Examiner* — Alaa Wadie Hussein (57) ABSTRACT

Disclosed is a membership analyzing method, including: obtaining data information of all members of a target group; classifying members with same first type information into a data set based on predetermined keywords; obtaining the type of first type information and data sets on condition that all members have been successfully classified into a corresponding data set, otherwise, if there is any remaining member failed to be classified into any data set, inputting data information of the remaining member into a predetermined classification model, to obtain the type of first type information and a data set of each remaining member; determining a tree structure of data sets based on the type of the first type information, and producing a graph for the tree structure; setting a same identification for the nodes of the same data set, and displaying second type information of each member in a display area.

9 Claims, 3 Drawing Sheets

MEMBERSHIP ANALYZING METHOD, APPARATUS, COMPUTER DEVICE AND STORAGE MEDIUM

CROSS REFERENCE TO RELATED APPLICATIONS

The present application claims the benefit of Chinese Patent Application No. 202110132763.1 filed on Jan. 29, 2021, the contents of which are incorporated herein by reference in their entirety.

TECHNICAL FIELD

This application relates generally to the technical field of computers, and more particularly relates to a membership analyzing method, an apparatus, a computer device and a storage medium.

BACKGROUND

There are multiple members in a group, such as a business group or a family group, and the members in the group may have hierarchical relationships. At present, the hierarchical relationships may be indicated in some manners. For example, regarding a business group, you can view an organizational chart displayed in a webpage online, and search for membership information via the chart. However, the organizational chart may be not updated in time, so it is difficult to get the latest organizational structure and obtain accurate membership information.

SUMMARY

According to various embodiments disclosed in this application, a membership analyzing method, an apparatus, a computer device and a storage medium are provided.

A membership analyzing method being executed by a processor of a computer device includes:

obtaining data information of all members of a target group from one or more data sources of a storage device, wherein, the data information includes first type information and second type information of each member;

classifying members with same first type information into a data set based on predetermined keywords, and storing the data set in the storage device;

determining whether each member has been successfully classified into a data set;

obtaining the type of the first type information and the data set of each member on condition that all members have been successfully classified into a corresponding data set, otherwise, if there is any remaining member failed to be classified into any data set, determining a data set of the remaining member by inputting data information of the remaining member into a predetermined classification model, so as to obtain the type of the first type information and the data set of each member of the target group;

determining a tree structure of the data sets based on the type of the first type information, and producing a graph for the tree structure, wherein a node in the tree structure represents a member;

setting a same identification for the nodes of the same data set, and displaying the second type information of each member in a display area of the node corresponding to the member on a display device, so as to generate and display the tree structure with identifications and second type information of the members.

A membership analyzing apparatus includes:

a first obtaining module, configured to obtain data information of all members of a target group from one or more data sources, wherein, the data information includes first type information and second type information of each member;

an analyzing module, configured to classify members with same first type information into a data set based on predetermined keywords;

a determining module, configured to determine whether each member has been successfully classified into a data set;

a second obtaining module, configured to obtain the type of the first type information and the data set of each member on condition that all members have been successfully classified into a corresponding data set;

a third obtaining module, configured to determine a data set of a remaining member by inputting data information of the remaining member into a predetermined classification model if there is any remaining member failed to be classified into any data set, so as to obtain the type of the first type information and the data set of each member of the target group;

a producing module, configured to determine a tree structure of the data sets based on the type of the first type information, and produce a graph for the tree structure, wherein a node in the tree structure represents a member;

a displaying module, configured to set a same identification for the nodes of the same data set, and display the second type information of each member in a display area of the node corresponding to the member, so as to generate and display the tree structure with identifications and second type information of the members.

A computer device includes a memory and one or more processors, wherein the memory stores computer-readable program instructions, and when the computer-readable program instructions are executed by the one or more processors, the one or more processors are enabled to perform following steps:

obtaining data information of all members of a target group from one or more data sources, wherein, the data information includes first type information and second type information of each member;

classifying members with same first type information into a data set based on predetermined keywords;

determining whether each member has been successfully classified into a data set;

obtaining the type of the first type information and the data set of each member on condition that all members have been successfully classified into a corresponding data set, otherwise, if there is any remaining member failed to be classified into any data set, determining a data set of the remaining member by inputting data information of the remaining member into a predetermined classification model, so as to obtain the type of the first type information and the data set of each member of the target group;

determining a tree structure of the data sets based on the type of the first type information, and producing a graph for the tree structure, wherein a node in the tree structure represents a member;

setting a same identification for the nodes of the same data set, and displaying the second type information of each member in a display area of the node corresponding to the member, so as to generate and display the tree structure with identifications and second type information of the members.

A non-volatile computer-readable storage media that stores computer-readable program instructions is provided, when the computer-readable program instructions are executed by one or more processors, the one or more processors are enabled to perform following steps:

obtaining data information of all members of a target group from one or more data sources, wherein, the data information includes first type information and second type information of each member;

classifying members with same first type information into a data set based on predetermined keywords;

determining whether each member has been successfully classified into a data set;

obtaining the type of the first type information and the data set of each member on condition that all members have been successfully classified into a corresponding data set, otherwise, if there is any remaining member failed to be classified into any data set, determining a data set of the remaining member by inputting data information of the remaining member into a predetermined classification model, so as to obtain the type of the first type information and the data set of each member of the target group;

determining a tree structure of the data sets based on the type of the first type information, and producing a graph for the tree structure, wherein a node in the tree structure represents a member;

setting a same identification for the nodes of the same data set, and displaying the second type information of each member in a display area of the node corresponding to the member, so as to generate and display the tree structure with identifications and second type information of the members.

Details of one or more embodiments of this application are provided in the following accompanying drawings and descriptions. Other features and advantages of this application become clear from the specification, the accompanying drawings, and the claims.

BRIEF DESCRIPTION OF DRAWINGS

To describe the technical solutions in the embodiments of this application more clearly, the following briefly describes the accompanying drawings required for describing the embodiments. Apparently, the accompanying drawings in the following descriptions show merely some embodiments of this application, and a person of ordinary skill in the art may still derive other drawings from these accompanying drawings without creative efforts.

DESCRIPTION OF EMBODIMENTS

To make the technical solutions and advantages of this application clearer and more comprehensible, the following further describes this application in detail with reference to the accompanying drawings and embodiments. It should be understood that the specific embodiments described herein are merely intended to explain this application, and are not intended to limit this application.

Figure 1:
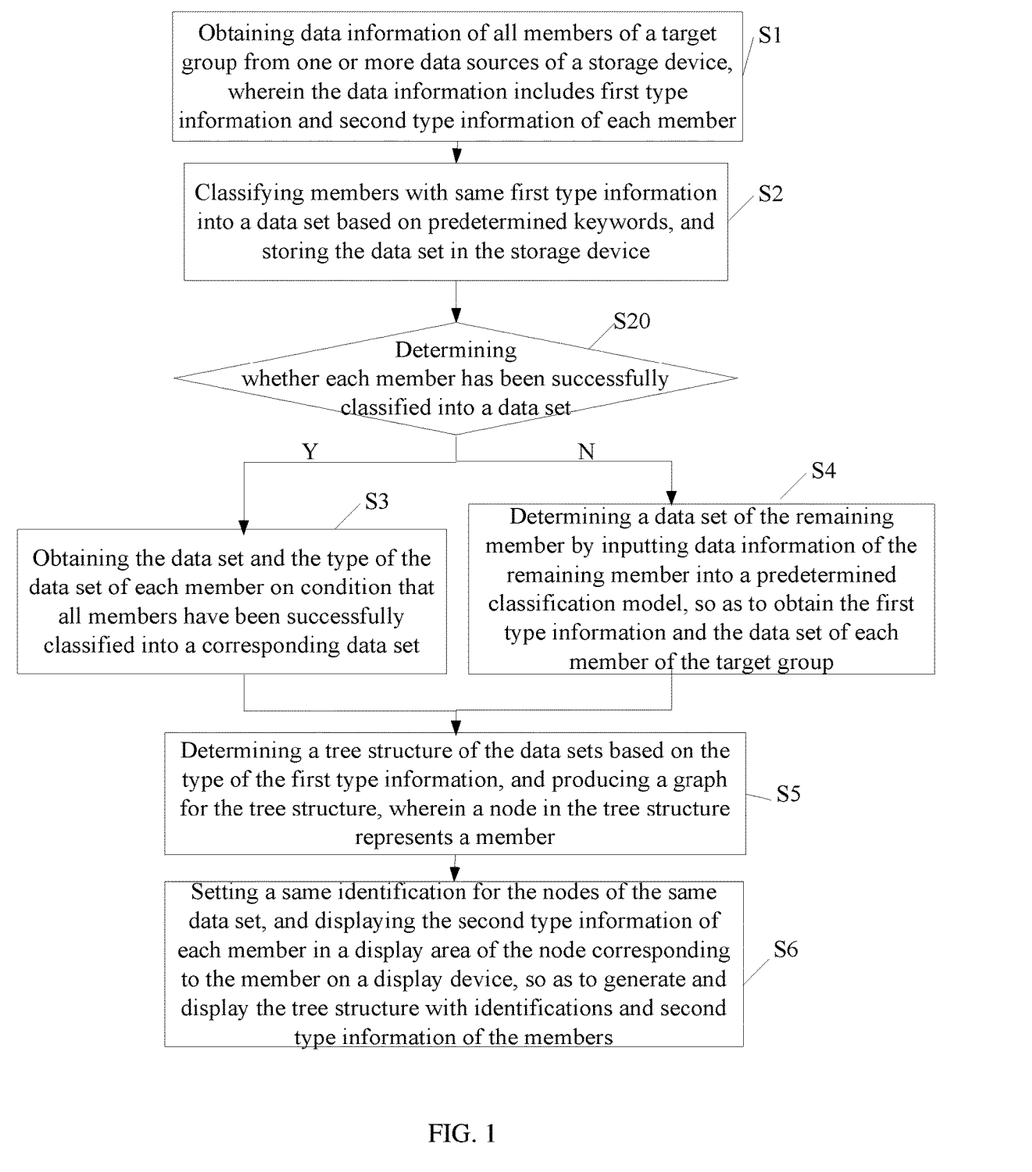
FIG. 1 is a schematic flowchart of a membership analyzing method according to one or more embodiments.

In an embodiment, as shown in FIG. 1, a membership analyzing method is provided. The method, which is executed by a processor of a computer device show in FIG. 4, includes following steps.

Step S1: obtaining data information of all members of a target group from one or more data sources of a storage device, wherein, the data information includes first type information and second type information of each member.

The data sources may include one or more databases which store data information collected from various websites, electronic newspaper, or other electronic media. A target group's members may include investors, directors, employees etc. of a company or an organization, or members of a family. For example, the data information may include a name and an age information of a member in the target group, an ID number, a home address, a face image, a work unit, a nationality, a job information in a company which the member works for, etc.

For example, for a company, the first type information is about job information. The job information may include a job position or a responsibility. The second type information is about the name, the face image, and the nationality, etc. For example, for a family, the first type information may include the age, or the name and the age, thus the hierarchical relationships of the family can be sorted out by the age, or the hierarchical relationship of the family can be sorted out combining the name with the age. The second type information may include the face image and the nationality, etc. In all the embodiments of the present invention, the target group is the company.

Step S2: classifying members with same first type information into a data set based on predetermined keywords, and storing the data set in the storage device.

The predetermined keywords include first type keywords and second type keywords, the first type keywords are about standard keywords, and the second type keywords are about non-standard keywords. The second type keywords are customized keywords, which can be edited.

Taking the first type information as the job information as an example, the second type information of a member includes a surname and a given name of the member, the first type keywords can be a standard name of a job position, such as sales representatives, sales managers, sales directors, and the second type keywords can be a non-standard name of a job position, such as governor. The type of the first type information may include director, manager, sale, etc.

In this embodiment, the members in the target group are classified into several data sets based on the type of the first type information, those members with the same type of the first type information are classified into the same data set. For example, members with the same job position are classified into the data set labeled as "A".

Step S20: determining whether each member has been successfully classified into a data set. If each member has been successfully classified into a corresponding data set, the procedure goes to step S3.

Step S3: obtaining the type of the first type information and the data set of each member on condition that all members have been successfully classified into a corresponding data set.

In step S20, if there is any remaining member failed to be classified into any data set, the procedure goes to step S4 from step S20.

Step S4: determining a data set of the remaining member by inputting data information of the remaining member into a predetermined classification model, so as to obtain the type of the first type information and the data set of each member of the target group.

Since the predetermined keywords may not be able to exhaust all the job positions in the actual situation, there may be members failed to be classified into any data set. At this time, a classification model can be used to obtain the type of the first type information and data set of the members.

The classification model is a model trained on massive data. The classification model can be a common classification models, such as a convolution neural network (CNN) model, a recurrent neural network (RNN) model, or a support vector machine (SVM) model. The input of the classification model is a variety of job positions, and the output of the classification model may include types of the job positions and the data set corresponding to each input job position, or the output may include one or more scores indicating one or more probabilities that which type the input job position belongs to. In the latter case, the type of the job position corresponding to the highest score is determined as the type of the job position of a member.

In this embodiment, a training process of the classification model includes:

obtaining various job positions, and marking the type of the job positions, and dividing the job positions into a sample set and a test set according to a predetermined ratio (e.g., 8:2). The sample set will be inputted into the classification model for training, and the test set will be inputted into the classification model for testing. An accuracy rate of the classification model will be obtained. If the accuracy rate of the classification model is greater than a predetermined value (e.g., 0.95), the training is ended.

Step S5: determining a tree structure of the data sets based on the type of the first type information, and producing a graph for the tree structure, wherein a node in the tree structure represents a member.

In this embodiment, there may be one or more types of job position within a company, different types of job position indicate the actual ranks. For example, the types of job position may include director, manager, sale and so on in a company, wherein 10 members as a first data set are sales representative, 2 members as a second data set are sales manager, and 1 member as a third data set is sales director. The actual ranks from top to bottom can be director, manager, sale, and the hierarchical relationship of the data sets from top to bottom will be determined by the ranks as: sales director>sales manager>sales representative. A tree structure can be determine based on the ranks of the data sets. The tree structure will be performed graphic processing to generate a graphic, wherein a node in the tree structure represents a member. The tree structure is displayed in a user interface of a computer device, wherein the user interface includes multiple display areas, and one node in the tree structure occupies one display area. The tree structure is preferably an organization chart (ochart).

Step S6: setting a same identification for the nodes of the same data set, and display the second type information of each member in a display area of the node corresponding to the member on a display device, so as to generate and display the tree structure with identifications and second type information of the members.

The members corresponding to the nodes with the same identification can be regarded as members of a same department. Display the second type information of each member on a display area of the node corresponding to the member, so as to generate and display the tree structure with identifications and second type information of the members, wherein the second type information include the name, the face image, and the nationality, etc.

Figure 2:
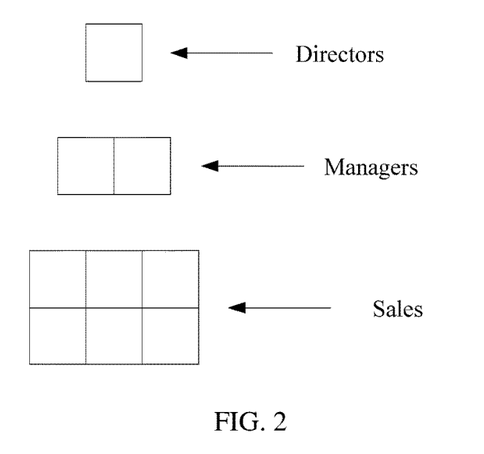
FIG. 2 is a graphic of a tree structure according to the embodiments of FIG. 1.

In this embodiment, as shown in the FIG. 2, there are three data sets, wherein a first data set can be directors, a second data set can be managers, and a third data set can be sales. Each small box in the FIG. 2 represents a node of the tree structure. The members in the same data set are identified with the same identification. For example, the nodes corresponding to the members in the same data set are marked with a same color, and the nodes corresponding to the members in different data sets are marked with different colors. For example, the nodes corresponding to the director's data set are marked in red, the nodes corresponding to the manager's data set are marked in yellow, and the nodes corresponding to the sales data set are marked in green. In addition, the second type information can be identified in a display area occupied by the corresponding node of the tree structure.

As described above, this embodiment first classifies members with same first type information into a data set based on predetermined keywords after obtaining the data information from a target group, determines whether each member has been successfully classified into a data set, if each member has been successfully classified into a data set, the type of the first type information and the data set of each member can be obtained, otherwise, if there is any remaining member failed to be classified into any data set, determines a data set of the remaining member by inputting data information of the remaining member into a predetermined classification model, so as to obtain the type of the first type information and the data set, and then determines a tree structure of the data sets based on the type of the first type information, a node in the tree structure represents a member, finally, sets a same identification for the nodes of the same data set, and the second type information of each member will be displayed on a display area of the user interface of the computer device where occupied by the node. This embodiment obtains data information from one or more data sources, uses a combination of predetermined keywords and classification models to perform classification on the data information, and determines a tree structure of the data sets based on the type of the first type information, this embodiment bases on technology of Big Data, it can accurately analyze the hierarchical relationship of group members, and save time and effort.

In a second embodiment, based on the above-mentioned embodiment of FIG. 1, the method further includes: determining members with the same surname, generating and displaying a first control icon for the nodes of the members with the same surname, and dynamically displaying the nodes of the members with the same surname in response to the first control icon is clicked.

In this embodiment, the user interface is divided into two areas, wherein a first area includes multiple display areas which occupied by the nodes of the tree structure, and a second area includes the remaining area of the user interface. One or more first control icons are generated, and the first control icons are displayed in a predetermined position in the user interface of the computer device, for example, the predetermined position may be a position of the second area of the user interface. One first control icon corresponds to two or more nodes of the members with the same surname. The nodes of the members with the same surname can be dynamically displayed in response to the corresponding first control icon is clicked, for example, the nodes of the members with the same surname "Zhang" can be flashed in response to the corresponding first control icon is clicked. In this way, the method roughly analyzes whether the company is a family business, and the membership of the members of the target group will be analyzed in more dimensions, and the objectivity and accuracy of analysis will be improved.

Furthermore, a family face recognition model can be trained to recognize whether the face images of the members of a company are face images of members in a same family. Specifically, the face images of members with the same surname are determined, and the face images of members with the same surname are inputted into the family face recognition model to obtain the result of whether multiple or all members with the same surname are members of the same family. In this way, the method analyzes accurately whether the company is a family business, and the hierarchical relationship of the members of the company can be analyzed more accurately.

In a third embodiment, based on the above-mentioned embodiments, the method further includes: determining members with the same surname and given name, generating and displaying a second control icon for the nodes of the members with the same surname and given name, and highlighting the nodes of the members with the same surname and given name in response to the second control icon is clicked, and merging data information of the members with the same surname and given name.

In this embodiment, considering that the data information of a member may be obtained from multiple different data sources, so there may be duplicate data information from two or more different data sources. In order to delete duplicate member information and simplify the tree structure, one or more second control icon are generated and displayed in a predetermined position in the user interface of the computer device, for example, the predetermined position may be a position of the second area of the user interface. One second control icon corresponds to two or more nodes of members with the same surname and given name. The nodes of the members with the same surname and given name can be highlighted, and the data information (e.g., two data records) of the members with the same surname and given name are merged as one. For example, the face images and the remaining data information of the members with the same surname and given name are merged. In this way, the members who are suspected to be duplicate members can be identified, and can be manually reviewed to determine whether the members are duplicate members, furthermore, the duplicate members can be removed and the data information of the duplicate members can be merged.

In a fourth embodiment, based on the above-mentioned embodiments, the method further includes:

obtaining face images of the members of the target group, inputting each of the face images into a predetermined gender analysis model, and determining a gender of each member corresponding to a face image in response that the gender analysis model successfully output an analysis result, otherwise, determining the gender of the member corresponding to the face image by analyzing the same surname and given name of the member, in response that the gender analysis model failed to output an analysis result, and displaying the gender of each member on the corresponding node of the member in the tree structure.

In this embodiment, the gender analysis model can be a classification model, and the classification model can be a classification model, such as the CNN model, the RNN model, or the SVM model. The inputs of the classification model are various face images, and the outputs of the classification model include a gender corresponding to each input face image, or the outputs include scores, which represent probabilities of an input face image belongs to male or female. In the latter case, a gender (e.g., male or female) with the highest score is determined as the gender of the input face image.

In this embodiment, a training process of the gender analysis model includes:

obtaining multiple face images (e.g., 100,000) of the members, and marking a gender of each member according to a corresponding face image of the member;

dividing the face images into a sample set and a validation set according to a predetermined ratio(e.g., 8:2);

training the gender analysis model using the sample set, and validating the gender analysis model using the validation set, and obtaining an accuracy rate of the gender analysis model;

ending the training until the accuracy rate is greater than or equal to a predetermined value (e.g., 0.95), thus the trained gender analysis model is determined.

In this embodiment, in the case the gender analysis model fails to recognize the gender of any member according to the input face image, or the scores are very similar, the gender of the member can be further determined by name analysis. Taking into account the differences between male and female names in different regions, the corresponding gender can be accurately determined. For example, in Japan and the United Kingdom, the differences between male and female names are relatively large, and thus the gender of the member can be determined based on the differences.

The gender is identified in the user interface of the computer device, where occupied by the node of the corresponding member after the gender of the member is determined. The gender may first be hidden in the user interface and just displayed according to user's activation. For example, the detailed information of a member is displayed in response to the node corresponding to a member is clicked, meanwhile, the member's gender is displayed. In this way, the display dimensions of the tree structure can be further increased, the membership can be analyzed in more dimensions, and the objectivity and accuracy of the analysis can be improved.

In a fifth embodiment, based on the above-mentioned embodiments, the method further includes:

receiving an adjustment instruction for a node corresponding to a member in the tree structure, and optimizing the classification model by adjusting the position of the node corresponding to the member in the tree structure based on the adjustment instruction.

In this embodiment, the hierarchical relationship of members corresponding to nodes in the tree structure can be checked manually. If a hierarchy of a member in the tree structure is wrong, the hierarchy of the member can be adjusted, so that the hierarchical relationship of the member in the tree structure is right. For example, a node corresponding to a member in the tree structure can be selected and dragged, and can be moved to another display area from present display area, so as to achieve a right hierarchy for the member.

The type of the first type information and data set can be determined again after adjusting the hierarchy of the member, and can be used as one of the sample sources of the training set of the above classification model, so that the classification model can be optimized. In this way, the objectivity and accuracy can be further improved.

Figure 3:
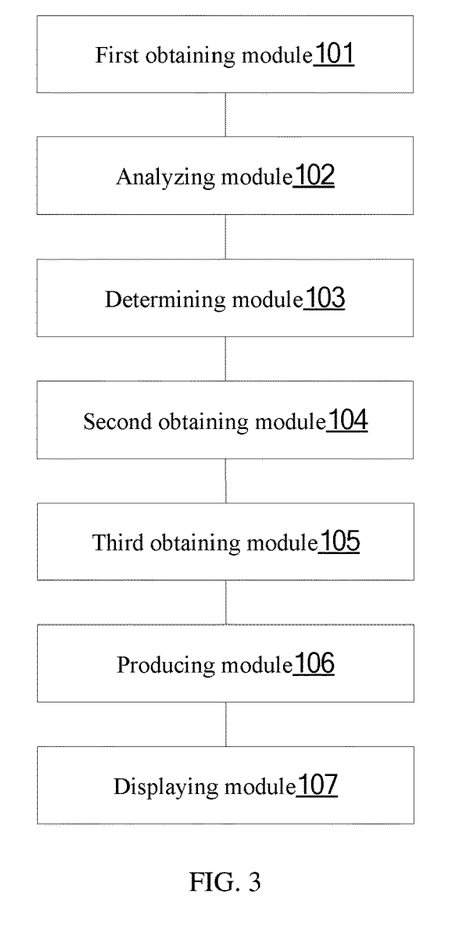
FIG. 3 is a structural diagram of a membership analysis apparatus according to one or more embodiments.

The present invention also provides a membership analyzing apparatus, which corresponds to the membership analyzing method in the above-mentioned embodiments in a one-to-one correspondence. As shown in FIG. 3, including:

The first obtaining module 101 is configured to obtain data information of all members of a target group from one or more data sources, wherein, the data information includes first type information and second type information of each member;

The analyzing module 102 is configured to classify members with same first type information into a data set based on predetermined keywords;

The determining module 103 is configured to determine whether each member has been successfully classified into a data set;

The second obtaining module 104 is configured to obtain the type of the first type information and the data set of each member on condition that all members have been successfully classified into a corresponding data set;

The third obtaining module 105 is configured to determine a data set of a remaining member by inputting data information of the remaining member into a predetermined classification model if there is any remaining member failed to be classified into any data set, so as to obtain the type of the first type information and the data set of each member of the target group;

The producing module 106 is configured to determine a tree structure of the data sets based on the type of the first type information, and produce a graph for the tree structure, wherein a node in the tree structure represents a member;

The displaying module 107 is configured to set a same identification for the nodes of the same data set, and display the second type information of each member in a display area of the node corresponding to the member, so as to generate and display the tree structure with identifications and second type information of the members.

The specific definition of the membership analyzing apparatus can be referred to the above definition of the membership analyzing method, which will not be repeated here. Each module in the above-mentioned membership analyzing apparatus can be implemented in whole or in part by software, hardware and a combination thereof. The above-mentioned modules may be embedded or independent of a processor in a computer device in the form of hardware, or may be stored in a memory of the computer device in the form of software, It can also be stored in the memory of the computer device in the form of software, so that the processor can call and execute the operations corresponding to the above modules.

The present invention also provides a computer device. The computer device is a device that can automatically perform numerical calculation and/or information processing in accordance with pre-set or stored instructions. The computer device may be a personal computer(PC), a smart phone, a tablet, a computer, or a single network server, a server group composed of multiple network servers, or a cloud composed of a large number of hosts or network servers based on cloud computing, in which cloud computing is a type of distributed computing, a super virtual computer composed of a group of loosely coupled computer sets.

Figure 4:
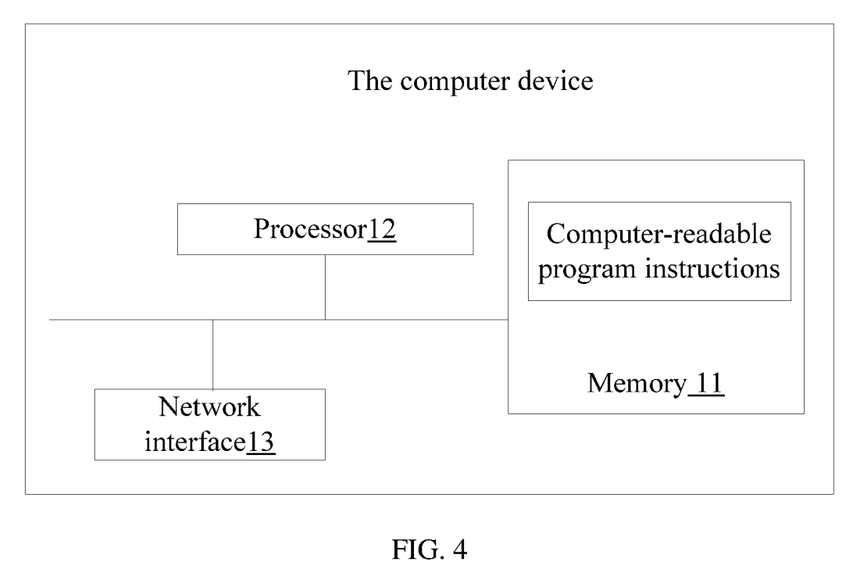
FIG. 4 is an internal structural diagram of a computer device according to one or more embodiments.

As shown in FIG. 4, the computer device may include, but is not limited to, a memory 11, a processor 12, and a network interface 13 that can be communicatively connected to each other through a system bus. The memory 11 stores computer-readable program instructions that can run on the processor 12. It should be pointed out that FIG. 4 only shows a computer device with components 11-13, but it should be understood that it is not required to implement all the illustrated components, more or fewer components can be implemented as an alternative.

The memory 11 may be a non-volatile memory and/or volatile memory. Non-volatile memory may include read only memory (ROM), programmable ROM (PROM), electrically programmable ROM (EPROM), electrically erasable programmable ROM (EEPROM), or flash memory. Volatile memory may include random access memory (RAM) or external cache memory. As an illustration and not a limitation, RAM is available in many forms, such as Static RAM (SRAM), Dynamic RAM (DRAM), Synchronous DRAM (SDRAM), Double Data Rate SDRAM (DDRS-DRAM), Enhanced SDRAM (ESDRAM), Synchronization Link DRAM (SLDRAM), Rambus Direct RAM (RDRAM), Direct Rambus DRAM(DRDRAM), and Rambus Dynamic RAM (RDRAM), etc. In this embodiment, the readable storage medium of the memory 11 is generally used to store an operating system and various application software installed in the computer device, for example, to store the computer-readable program instructions. In addition, the memory 11 can also be used to temporarily store various types of data that have been output or will be output.

The processor 12 may be a central processing unit (CPU), a controller, a microcontroller, a microprocessor, or other data processing chip in some embodiments for running the computer-readable program instructions or processing data stored in the memory 11.

The network interface 13 may include a standard wireless network interface and a wired network interface. The network interface 13 can be usually used to establish a communication connection between the computer device and other electronic devices.

The computer-readable program instructions are stored in the memory 11, and the computer-readable instructions can be executed by one or more processors 12, the one or more processors 12 are enabled to perform following steps:

obtaining data information of all members of a target group from one or more data sources, wherein, the data information includes first type information and second type information of each member;

classifying members with same first type information into a data set based on predetermined keywords;

determining whether each member has been successfully classified into a data set;

obtaining the type of the first type information and the data set of each member on condition that all members have been successfully classified into a corresponding data set, otherwise, if there is any remaining member failed to be classified into any data set, determining a data set of the remaining member by inputting data information of the remaining member into a predetermined classification model, so as to obtain the type of the first type information and the data set of each member of the target group;

determining a tree structure of the data sets based on the type of the first type information, and producing a graph for the tree structure, wherein a node in the tree structure represents a member;

setting a same identification for the nodes of the same data set, and displaying the second type information of each member in a display area of the node corresponding to the member, so as to generate and display the tree structure with identifications and second type information of the members.

Preferably, the first type information of a member includes job information of the member, and the second type information of a member includes a surname and a given name of the member.

Further, the processor also performs following steps: determining members with the same surname, generating and displaying a first control icon for the nodes of the members with the same surname, and dynamically displaying the nodes of the members with the same surname in response to the first control icon is clicked.

Further, the processor also performs following steps: determining members with the same surname and given name, generating and displaying a second control icon for the nodes of the members with the same surname and given name, and highlighting the nodes of the members with the same surname and given name in response to the second control icon is clicked, and merging data information of the members with the same surname and given name.

Further, the processor also performs following steps: obtaining face images of the members, inputting each of the face images into a predetermined gender analysis model, and determining a gender of each member corresponding to a face image in response that the gender analysis model successfully output an analysis result, otherwise, determining the gender of the member corresponding to the face image by analyzing the same surname and given name of the member, in response that the gender analysis model failed to output an analysis result, and displaying the gender of each member on the corresponding node of the member in the tree structure.

Preferably, a training process of the gender analysis model includes:
obtaining multiple face images of the members, and marking a gender of each member according to a corresponding face image of the member;
dividing the face images into a sample set and a validation set according to a predetermined ratio ;
training the gender analysis model using the sample set, and validating the gender analysis model using the validation set, and obtaining an accuracy rate of the gender analysis model;
ending the training until the accuracy rate is greater than or equal to a predetermined value.

Further, the processor also performs following steps: determining face images of the members with the same surname, inputting the face images into a predetermined family face recognition model, obtaining a result outputted by the family face recognition model, and analyzing weather the members with the same surname are family members based on the result.

Further, the processor also performs following steps:
receiving an adjustment instruction for a node corresponding to a member in the tree structure, and optimizing the classification model by adjusting the position of the node corresponding to the member in the tree structure based on the adjustment instruction.

The invention also provides a non-volatile computer-readable storage medium, the non-volatile computer-readable storage medium may be a non-volatile memory and/or volatile memory, on which computer-readable program instructions are stored. When the computer-readable program instructions are executed by a processor, the steps of the method for analyzing the membership in the foregoing embodiments are implemented, for example, the steps from step S1 to step S6 shown in FIG. 1, or, when the computer-readable program instructions are executed by the processor, the function of each module/unit of the membership analyzing apparatus in the above-mentioned embodiments is realized, for example, the function of the module 101 to the module 107 shown in FIG. 3. To avoid repetition, it won't repeat them here.

A person of ordinary skill in the art can understand that all or part of the processes in the above-mentioned embodiments can be implemented by a computer program instructing relevant hardware. When the computer program is executed, it may include the processes of the above-mentioned method embodiments.

The order of the above embodiments does not represent the advantages and disadvantages of the embodiments.

The technical features of the foregoing embodiments may be randomly combined. For brevity of description, not all possible combinations of the technical features of the foregoing embodiments are described. However, all the combinations of these technical features should be considered to be within the scope of this specification provided that the combinations are not contradictory.

The foregoing embodiments are merely several implementations of this application, and description of the implementations is relatively specific and detailed, but shall not be understood as a limitation on the scope of the present invention. It should be noted that a person of ordinary skill in the art may make several variations and improvements without departing from the concept of this application, and the variations and improvements shall fall within the protection scope of this application. Therefore, the protection scope of this application patent shall be subject to the appended claims.

The invention claimed is:

1. A membership analyzing method executed by a processor of a computer device, the membership analyzing method comprising:
obtaining personal information of all persons of a target group from one or more data sources of a storage device, wherein the personal information includes first type information and second type information of each person;
classifying persons with same first type information into a same respective set based on predetermined keywords, and storing the set in the storage device;
determining whether each person has been successfully classified into a set;
their respective sets, obtaining a type of the first type information and the set of each person, otherwise, in response to there being at least one remaining person failing to be classified into any set, determining a set of each of the at least one remaining person by inputting the personal information of each of the at least one remaining person into a predetermined classification model thus obtaining the type of the first type information and the set of each person of the target group;
determining a tree structure of the sets based on the types of the first type information, and producing a graph for the tree structure, wherein each node in the tree structure represents a person;
setting a same identifier for the nodes of each same set, and displaying the second type information of each person in a display area of the node corresponding to the person on a display device, so as to generate and display the tree structure with identifiers and second type information of the persons; wherein setting a same identifier for the nodes of each same set comprises marking the nodes corresponding to the persons belonging to each same set with a same color, and marking the nodes belonging to different sets with different colors;
wherein the first type of information of each person includes job information of the person, and the second type of information of each person includes a surname and a given name of the person;
wherein the method further comprises: determining persons with the same surname, generating and displaying a first control icon for the nodes of the persons with the same surname, and dynamically displaying the nodes of the persons with the same surname in response to the first control icon being clicked, allowing a user to preliminarily analyze whether the target group is a family business;

wherein the method further comprises: determining persons with the same surname and given name, generating and displaying a second control icon for the nodes of the persons with the same surname and given name, and in response to the second control icon being clicked, highlighting the nodes of the persons with the same surname and given name and merging the personal information of the persons with the same surname and given name so that duplicate persons in the tree structure are identified and removed;

wherein the method further comprises:

receiving an adjustment instruction for a node corresponding to a person in the tree structure, and optimizing the classification model by adjusting a position of the node corresponding to the person in the tree structure based on the adjustment instruction.

2. The method according to claim 1, further comprising:

obtaining face images of the persons, inputting each of the face images into a predetermined gender analysis model, and determining a gender of each person corresponding to a face image in response to the gender analysis model successfully outputting an analysis result, otherwise in response to the gender analysis model failing to output an analysis result, determining the gender of the person corresponding to the face image by analyzing the same surname and given name of the person, and displaying the gender of each person on the corresponding node of the person in the tree structure.

3. The method according to claim 2, wherein a training process of the gender analysis model comprises:

marking a gender of each person according to a corresponding face image of the person;

dividing the face images into a sample set and a validation set according to a predetermined ratio ;

training the gender analysis model using the sample set, and validating the gender analysis model using the validation set, and obtaining an accuracy rate of the gender analysis model;

ending the training until the accuracy rate is greater than or equal to a predetermined value.

4. The method according to claim 1, further comprising:

obtaining face images of the persons, determining the face images of the persons with a same surname, inputting the face images of the persons with the same surname into a predetermined family face recognition model, obtaining a result outputted by the family face recognition model, and analyzing whether the persons with the same surname are family members based on the result.

5. A computer device, comprising a memory and one or more processors, wherein the memory stores computer-readable program instructions, and when the computer-readable program instructions are executed by the one or more processors, the one or more processors are enabled to perform following steps:

obtaining personal information of all persons of a target group from one or more data sources, wherein the personal information includes first type information and second type information of each person;

classifying persons with same first type information into a same respective set based on predetermined keywords;

determining whether each person has been successfully classified into a set;

obtaining a type of the first type information and the set of each person, otherwise, in response to there being at least one remaining person failing to be classified into any set, determining a set of each of the at least one remaining person by inputting the personal information of each of the at least one remaining person into a predetermined classification model thus obtaining the type of the first type information and the set of each person of the target group;

determining a tree structure of the sets based on the types of the first type information, and producing a graph for the tree structure, wherein each node in the tree structure represents a person;

setting a same identifier for each same set, and displaying the second type information of each person in a display area of the node corresponding to the person, so as to generate and display the tree structure with identifiers and second type information of the persons; wherein setting a same identifier for the nodes of each same set comprises marking the nodes corresponding to the persons belonging to each same set with a same color, and marking the nodes belonging to different sets with different colors;

wherein the first type of information of each person includes job information of the person, and the second type of information of each person includes a surname and a given name of the person;

wherein the method further comprises: determining persons with the same surname, generating and displaying a first control icon for the nodes of the persons with the same surname, and dynamically displaying the nodes of the persons with the same surname in response to the first control icon being clicked, allowing a user to preliminarily analyze whether the target group is a family business;

wherein the method further comprises: determining persons with the same surname and given name, generating and displaying a second control icon for the nodes of the persons with the same surname and given name, and in response to the second control icon being clicked, highlighting the nodes of the persons with the same surname and given name and merging the personal information of the persons with the same surname and given name so that duplicate persons in the tree structure are identified and removed;

wherein the method further comprises:

receiving an adjustment instruction for a node corresponding to a person in the tree structure, and optimizing the classification model by adjusting a position of the node corresponding to the person in the tree structure based on the adjustment instruction.

6. The computer device according to claim 5, wherein the processor further performs following steps:

obtaining face images of the persons, inputting each of the face images into a predetermined gender analysis model, and determining a gender of each person corresponding to a face image in response to the gender analysis model successfully outputting an analysis result, otherwise in response to the gender analysis model failing to output an analysis result, determining the gender of the person corresponding to the face image by analyzing the same surname and given name of the person, and displaying the gender of each person on the corresponding node of the person in the tree structure.

7. The computer device according to claim 6, wherein the processor further performs following steps:
   marking a gender of each person according to a corresponding face image of the person ;
   dividing the face images into a sample set and a validation set according to a predetermined ratio ;
   training the gender analysis model using the sample set, and validating the gender analysis model using the validation set, and obtaining an accuracy rate of the gender analysis model;
   ending the training until the accuracy rate is greater than or equal to a predetermined value.

8. The computer device according to claim 5, wherein the second type information further includes avatar, and the processor further performs following steps:
   obtaining face images of the persons, determining the face images of the persons with a same surname, inputting the face images of the persons with the same surname into a predetermined family face recognition model, obtaining a result outputted by the family face recognition model, and analyzing whether the persons with the same surname are family members based on the result.

9. A non-transitory non-volatile computer-readable storage media, wherein the computer-readable storage medium stores computer-readable program instructions, when the computer-readable program instructions are executed by one or more processors, the one or more processors are enabled to perform following steps: obtaining personal information of all persons of a target group from one or more data sources, wherein the personal information includes first type information and second type information of each person; classifying persons with same first type information into a same respective set based on predetermined keywords; determining whether each person has been successfully classified into a set; obtaining the type of the first type information and the set of each person, otherwise, in response to there being at least one remaining person failing to be classified into any set, determining a set of each of the at least one remaining person by inputting the personal information of each of the at least one remaining person into a predetermined classification model thus obtaining the type of the first type information and the set of each person of the target group; determining a free structure of the sets based on the types of the first type information, and producing a graph for the free structure, wherein each node in the free structure represents a person; setting a same identifier for each same set, and displaying the second type information of each person in a display area of the node corresponding to the person, so as to generate and display the free structure with identifiers and second type information of the persons; wherein setting a same identifier for the nodes of each same set comprises marking the nodes corresponding to the persons belonging to each same set with a same color, and marking the nodes belonging to different sets with different colors; wherein the first type of information of each person includes job information of the person, and the second type of information of each person includes a surname and a given name of the person; wherein the method further comprises: determining persons with the same surname, generating and displaying a first control icon for the nodes of the persons with the same surname, and dynamically displaying the nodes of the persons with the same surname in response to the first control icon being clicked, allowing a user to preliminarily analyze whether the target group is a family business; wherein the method further comprises: determining persons with the same surname and given name, generating and displaying a second control icon for the nodes of the persons with the same surname and given name, and in response to the second control icon being clicked, highlighting the nodes of the persons with the same surname and given name and merging the personal information of the persons with the same surname and given name so that duplicate persons in the free structure are identified and removed; wherein the method further comprises: receiving an adjustment instruction for a node corresponding to a person in the free structure, and optimizing the classification model by adjusting a position of the node corresponding to the person in the free structure based on the adjustment instruction.

\* \* \* \* \*